(12) United States Patent
Zhang (10) Patent No.: US 8,025,127 B2
(45) Date of Patent: Sep. 27, 2011

(54) TELESCOPIC TABLE BOARD POSITIONED WITH RESILIENT PIN

(75) Inventor: Jian Yuan Zhang, Suzhou (CN)

(73) Assignee: Suzhou Pica Aluminum Industry Ltd., Suzhou (CN)

( * ) Notice: Subject to any disclaimer, the term of this patent is extended or adjusted under 35 U.S.C. 154(b) by 544 days.

(21) Appl. No.: 12/087,878

(22) PCT Filed: Oct. 8, 2006

(86) PCT No.: PCT/CN2006/002612
§ 371 (c)(1),
(2), (4) Date: Jul. 30, 2008

(87) PCT Pub. No.: WO2007/085155
PCT Pub. Date: Aug. 2, 2007

(65) Prior Publication Data
US 2009/0173255 A1    Jul. 9, 2009

(30) Foreign Application Priority Data
Jan. 26, 2006    (CN) ....................... 2006 2 0069086 U (51) Int. Cl.
*E04G 3/00* (2006.01)
(52) U.S. Cl. ........................................ 182/188
(58) Field of Classification Search ................. 182/223, 182/119, 222, 188; 248/346.1; 16/429; 292/152; 269/289; 108/69; 312/333
See application file for complete search history.

(56) References Cited

U.S. PATENT DOCUMENTS

| | | | |
|---|---|---|---|
| 103,347 A * | 5/1870 | Lepp ............................ 83/436.3 |
| 2,883,219 A * | 4/1959 | Cox .............................. 403/105 |
| 4,735,151 A * | 4/1988 | Bisbing ........................... 108/69 |
| 4,991,325 A | 2/1991 | Teduschi |
| 5,330,211 A | 7/1994 | Nicholson |
| 5,460,392 A | 10/1995 | Hansen |
| 5,579,558 A * | 12/1996 | Newman et al. ................. 16/429 |
| 6,039,421 A * | 3/2000 | Fulterer ......................... 312/333 |
| 6,546,596 B2 * | 4/2003 | Grote et al. ...................... 16/429 |
| 6,568,308 B2 * | 5/2003 | Ricker .......................... 83/477.2 |
| 6,883,208 B1 * | 4/2005 | Huang ............................. 16/429 |
| 7,497,490 B2 * | 3/2009 | Yamaguchi ................... 292/262 |

FOREIGN PATENT DOCUMENTS
EP    1 391 165 A1    2/2004
GB       2353320 A *   2/2001

* cited by examiner

Primary Examiner — Katherine Mitchell
Assistant Examiner — Candace L Bradford
(74) Attorney, Agent, or Firm — Oliff & Berridge, PLC (57) ABSTRACT

A telescopic table board positioned with a resilient pin is provided, which is characterized by the following features: The telescopic table board includes a left table board and a right table board slidely nested with each other; as for the left table board and the right table board, one of them is fixedly provided with a rack, while the other with a corresponding seat bore, in which is a resilient pin positioned, which is mainly composed of a positioning fastener and a spring; the positioning fastener is provided at the head with a tooth head engaged with the corresponding rack, extends at the tail through the seat bore, and is provided at the tail end with a handle; and the spring is sleeved onto the positioning fastener, and functions between the positioning fastener and the seat bore, thus constituting the resilient-pin type telescopic positioning mechanism between the left table board and the right table board. The present utility model endows the operation table board or gangplank with the telescopic function, thus enhancing versatility and satisfying different requirements for length of the table board (gangplank) on various application occasions.

9 Claims, 6 Drawing Sheets

FIG 9 ically be a gangplank, a vehicle washing table board, a stand table board, a mini scaffold platform, etc.

TELESCOPIC TABLE BOARD POSITIONED WITH RESILIENT PIN

FIELD OF THE UTILITY MODEL

The present utility model relates to an operation table board for construction and operation, and particularly to a telescopic table board, that is, the table board can be telescopic along the length direction, so as to satisfy different requirements for length of the table board on various application occasions. This operation table board can specifically be a gangplank, a vehicle washing table board, a stand table board, a mini scaffold platform, etc.

BACKGROUND OF THE UTILITY MODEL

A mini operation table (or a work table, or a service table) is very common in daily life and work, such as a dedicated vehicle washing table and a domestic mini scaffold. The operation table is usually composed of a table board and bracing feet, whereas it is called a gangplank when the operation table board is separately used as an apparatus. The gangplank is more flexible and convenient to use, and also has a very wide application scope, especially in the construction field. It is also usually used to connect two planes (such as a ship's gangplank used on a mini boat for getting aboard or off the boat). Therefore, the operation table and the gangplank are all current common underlaying apparatuses, which make it easy for people to operate and move aloft and bring convenience to people's lives and work.

In the prior art, the operation table board or gangplank is still a traditional piece of flat plate, which has a fixed length and is not telescopic. However, there are different requirements for the length of the work table board on different actual application occasions. For example, when the operation table is used as a footrest underlay of a domestic mini scaffold, the operation is generally performed in one position, and the operation table board is unnecessary to be too large, too large an operation table board not only occupying too much space but also increasing cost; when the operation table is used as a vehicle washing table, the table board is required to be designed longer because of the longer body of the vehicle, which permits people to move left and right on the operation table, and to avoid the trouble of getting down off the operation table before moving the operation table. However, the problem is more obvious with the gangplank. The gangplank with a fixed length cannot be flexibly spanned over various shelves, making the application scope consumedly limited. The gangplank not in use cannot be folded, either, occupying too much an area.

Therefore, the prior factory operation table boards or gangplanks are all designed for a particular application occasion, with poor versatility. While the main requirements the current consumers have for such products as domestic ladders and operation tables are high versatility, a wide application scope, and a small volume for portability. Neither the operation table board nor the gangplank of the prior art can satisfy the above requirements.

CONTENTS OF THE UTILITY MODEL

The present utility model provides a telescopic table board positioned with a resilient pin, aiming to make the table board telescopic, thus enhancing versatility and satisfying different requirements for length of the table board on various application occasions.

In order to attain the above-mentioned purpose, a technical solution of the present utility model is as below: A telescopic table board positioned with a resilient pin is provided, which includes a left table board and a right table board slidely nested with each other; as for the left table board and the right table board, one of them is fixedly provided with a rack, while the other with a corresponding seat bore, in which is the resilient pin positioned, which is mainly composed of a positioning fastener and a spring; the positioning fastener is provided at the head with a tooth head engaged with the corresponding rack, extends at the tail through the seat bore, and is provided at the tail end with a handle; and the spring is sleeved onto the positioning fastener, and functions between the positioning fastener and the seat bore, thus constituting the resilient-pin type telescopic positioning mechanism between the left table board and the right table board.

The explanation for the relevant content of the above technical solution is as below:

1. In the above solution, the resilient pin is in a point-moving state, that is, the tooth head of the positioning fastener and the rack are contactively engaged with each other in a locking state under normal conditions because of action of the spring; pull the handle when unlocking, that is, drive the positioning fastener to retract, making the tooth head escape from the rack so as to be in an unlocking state; loose the handle, and then the resilient pin will again be reset and locked.

In order to make the operation more convenient, an operator does not have to pull the handle all along while unlocks and adjusts length of the table board. The following specific solution can be designed for a long-term positioning effect: The handle is provided with a cylindrical inserted segment, which is inserted in the seat bore, which is provided inside with a positioning lug. The inserted segment is provided on the head face with a locking positioning slot corresponding to the positioning lug, thus forming two shift positions, one being high while the other low, on the head face of the inserted segment, corresponding to the locking state and the unlocking state, respectively.

2. In the above solution, the seat bore can be provided inside with one or more positioning lugs. The most preferred solution among them is as below: The seat bore is provided inside with two positioning lugs symmetrically positioned up and down; the inserted segment is provided on the head face with the two locking positioning slots corresponding to the two positioning lugs; and the above-mentioned two locking positioning slots are further provided, in the place with 90° rotation round the central axis of the inserted segment, with two unlocking positioning slots.

3. In the above solution, the positioning fastener is rotatively sleeved onto the handle. The positioning fastener is cubic in the head, and the seat bore also square in the end facing the positioning fastener, the head of the positioning fastener being inserted into the square end of the seat bore to get both fitted. When the handle is turned with this, only the handle is revolved, while its positioning fastener not revolved with it, thus keeping the tooth head at the head of the positioning fastener to be engaged with the rack. Certainly, the positioning fastener can also be directly fixedly connected with the handle, this solution being also included.

4. In the above solution, the rack, the seat bore and the resilient pin are all positioned on the side of the left table board and the right table board, respectively.

5. In the above solution, the resilient-pin type telescopic positioning mechanism further includes a seat body, where the seat bore is drilled and via which positioned on the left table board or the right table board.

6. In the above solution, the resilient pin can be positioned either inclinely or vertically, vertical to the rack being the most preferred position.

7. The sentence in the above solution, "the table board includes the left table board and the right table board slidely nested with each other", includes the following two specific nested connection methods: a. As for the left table board or the right table board, one of them is designed at the bottom in a chute form, while the other nested into this chute, thus constituting slide connection; and this chute can be either integrally fabricated with the table board, or additionally connected under the flat table board as an independent chute. b. The left table board and the right table board are all made up of straight poles spaced in parallel with each other and connected via an outer frame, that is, the left table board and the right table board are in a grid form, comprising surface of the straight pole and partition of the empty slot; and when the left table board is connected with the right table board, one of them is connectively inserted at the straight pole into the other at the empty slot, thus constituting slide connection;

8. In the above solution, the telescopic positioning mechanism is unlimited in number. It is generally required only to provide one telescopic positioning mechanism on one side of the table board. Certainly, one telescopic positioning mechanism can also be provided on both sides of the table board, respectively. The relative positions of the left table board and the right table board are locked by the action of the telescopic positioning mechanism between them.

9. In the above solution, the "positioning lug" refers to a convex object positioned inside the seat bore, which can be in a form of either a lump or a bar, including a boss, a convex rib, etc.

Figure 1:
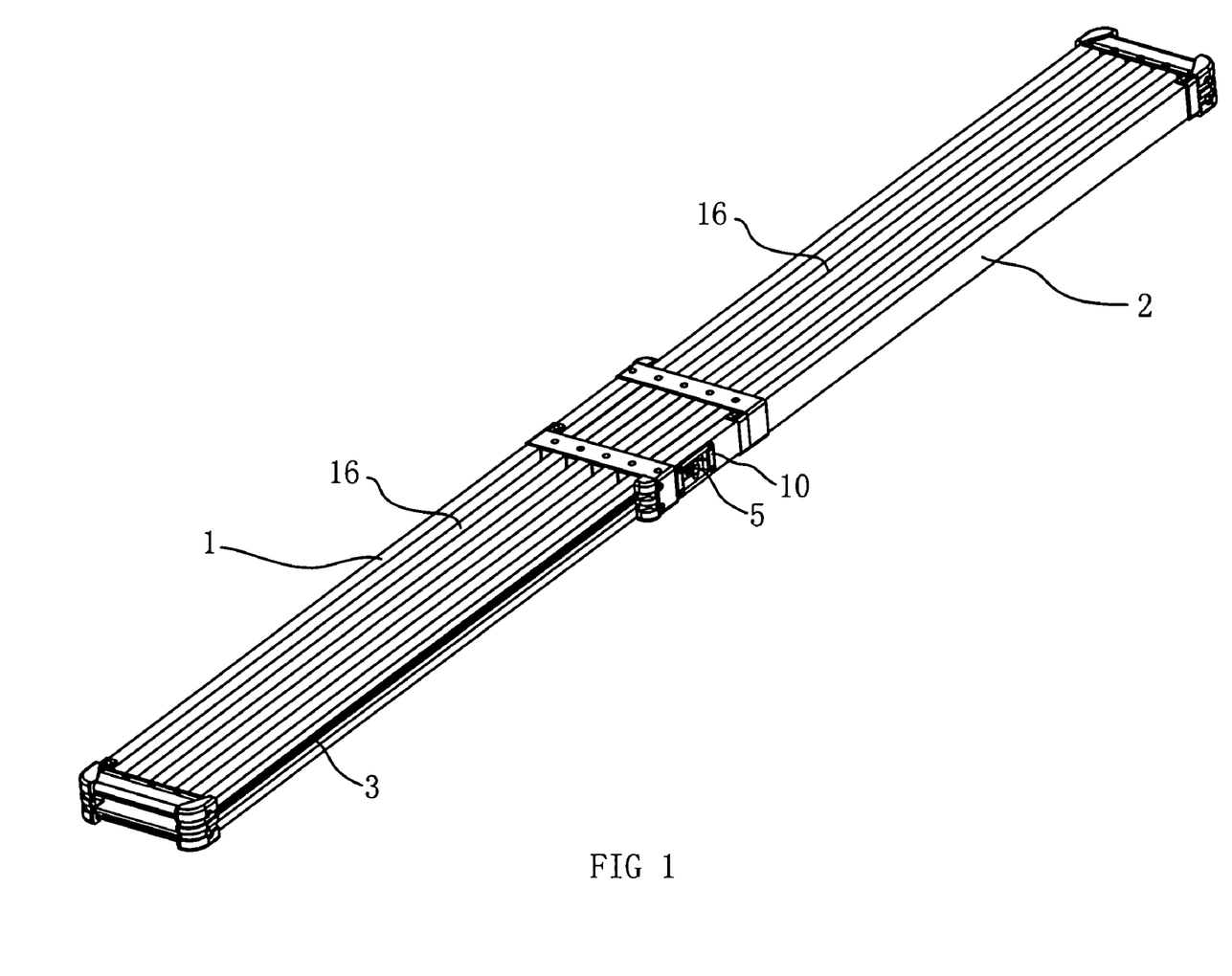
FIG. 1 is a structural schematic view of the present utility model.
Figure 5:
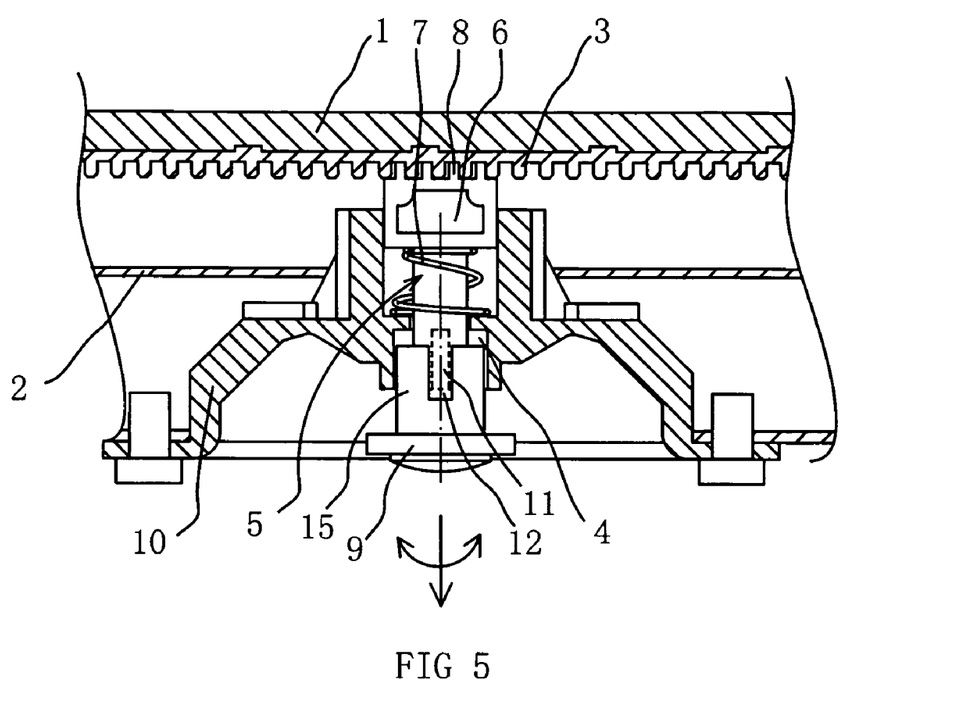
FIG. 5 is Schematic View 1 of the resilient-pin type telescopic positioning mechanism of the present utility model in a working state, it being in a locking state in this figure.
Figure 6:
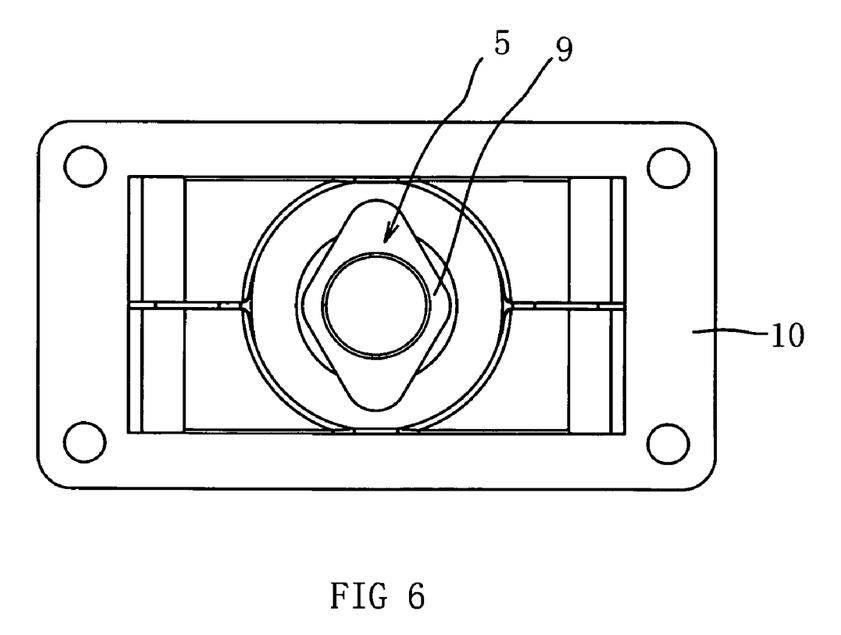
FIG. 6 is a top schematic view of FIG. 5.
Figure 7:
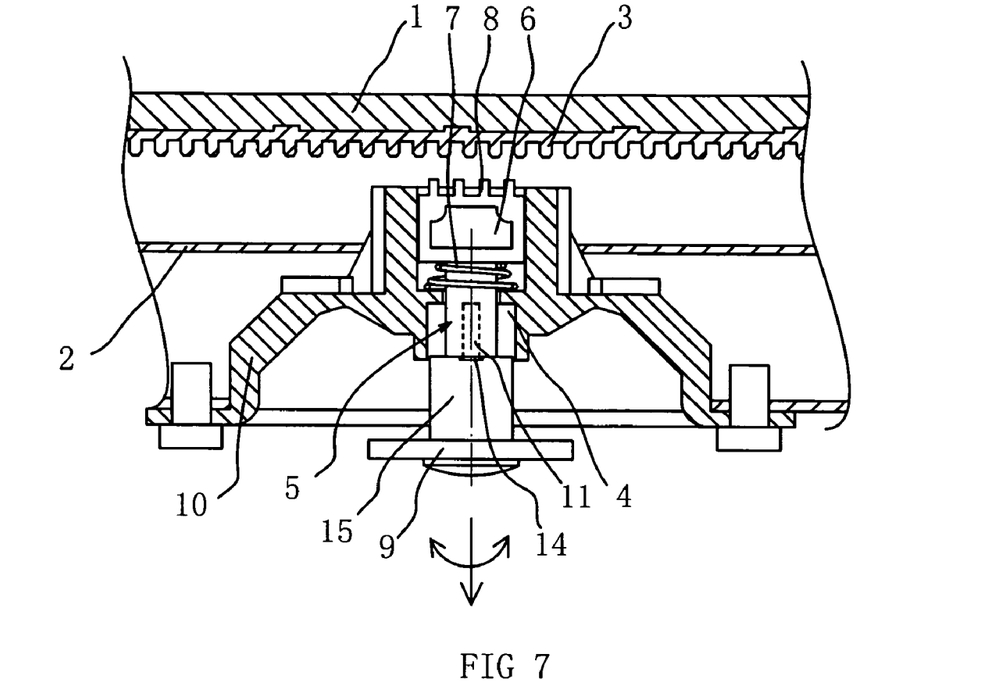
FIG. 7 is Schematic View 2 of the resilient-pin type telescopic positioning mechanism of the present utility model in a working state, it being in an unlocking state in this figure.
Figure 8:
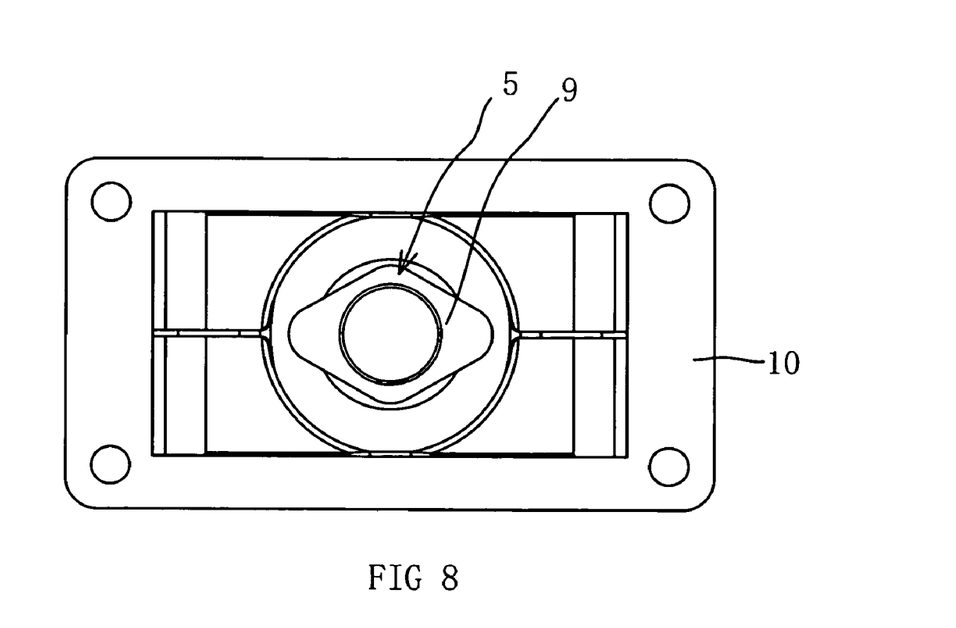
FIG. 8 is a top schematic view of FIG. 7.

The work principle of the present utility model is as below: As shown in FIG. 1, the left table board 1 and the right table board 2 are all made up of the straight poles 16 spaced in parallel with each other and connected via the outer frame. When the left table board 1 is connected with the right table board 2, one of them is connectively inserted at the straight pole 16 into the other at the empty slot, thus constituting slide connection. The left table board 1 and the right table board 2 can be arbitrarily extended, and locked by the telescopic positioning mechanism when the two table boards are extended to the desired position. The locking and unlocking operation processes of the telescopic positioning mechanism are as below: Under a normal state (see FIGS. 5 and 6), the tooth head 8 of the positioning fastener 6 and the rack 3 are contactively engaged with each other under the elastic action of the spring 7. Certainly, here the positioning lug 11 gets stuck in the locking positioning slot 12, and is positioned in a locking state. To unlock, an operator pulls the handle 9 (according to the arrowhead shown in FIG. 5), making the positioning fastener 6 press the spring 7 to move outward, further making the tooth head of the positioning fastener 6 escape from the rack 3 to unlock, with which the positioning lug 11 also moves out of the locking positioning slot 12. Then the handle 9 is rotated by 90° in a clockwise or counterclockwise direction (see the arrowhead in FIG. 5), making the positioning lug 11 slide into the unlocking positioning slot 14 along the head face of the inserted segment 15 of the handle 9, thus positioning the unlocking state (see FIGS. 7 and 8). Here the relative positions of the left table board 1 and the right table board 2 are telescopically changed, so that the overall length of the table board is adjusted. When the length is adjusted in place, the handle 9 is then pulled and rotated by 90° (according to the arrowhead shown in FIG. 7), making the positioning lug 11 being switched from the unlocking positioning slot 14 back to the locking positioning slot 12. The positioning fastener 6 is stretched out to reset, recovering to the locking state.

Because of application of the above technical solution, the present utility model has the following advantages compared to the prior art:

1. Because of the unique design of the present utility model, which includes the left table board and the right table board slidely connected with each other, the table board can be arbitrarily extended to get the length adjusted, consumedly enhancing its versatility, making it applicable on several occasions, that is, it can be used as a domestic mini scaffold or meanwhile as a vehicle washing table; on the other hand, also because of the adjustable length of the table board, the table board can be shorten to the smallest size while being folded, saving the storage space.

2. Because the telescopic positioning mechanism of the present utility model is made up of the resilient pin and the rack cooperated with each other, there are numerous adjusting shift positions, substantially realizing infinitely variable adjustment, making an operator position at various lengths fully upon request.

3. Because the present utility model adopts the resilient-pin type telescopic positioning mechanism, it is both reliable and convenient to position, simple in structure, and convenient in fabrication.

In the above drawings: 1. Left table board; 2. right table board; 3. rack; 4. seat bore; 5. resilient pin; 6. positioning fastener; 7. spring; 8. tooth head; 9. handle; 10. seat body; 11. positioning lug; 12. locking positioning slot; 14. unlocking positioning slot; 15. inserted segment; and 16. straight pole.

DETAILED DESCRIPTION OF THE EMBODIMENTS

The present utility model will further be described below with reference to drawings and embodiments.

Embodiment

As shown in FIG. 1, a telescopic table board or gangplank positioned with a resilient pin is provided, which includes the left table board 1 and the right table board 2 slidely nested with each other; the left table board 1 and the right table board 2 are all made up of the straight poles 16 spaced in parallel with each other and connected via the outer frame, that is, the left table board 1 and the right table board 2 are in a grid form comprising surface of the straight pole 16 and partition of the empty slot; when the left table board 1 is connected with the right table board 2, one of them is connectively inserted at the straight pole 16 into the other at the empty slot, thus constituting slide connection.

Figure 2:
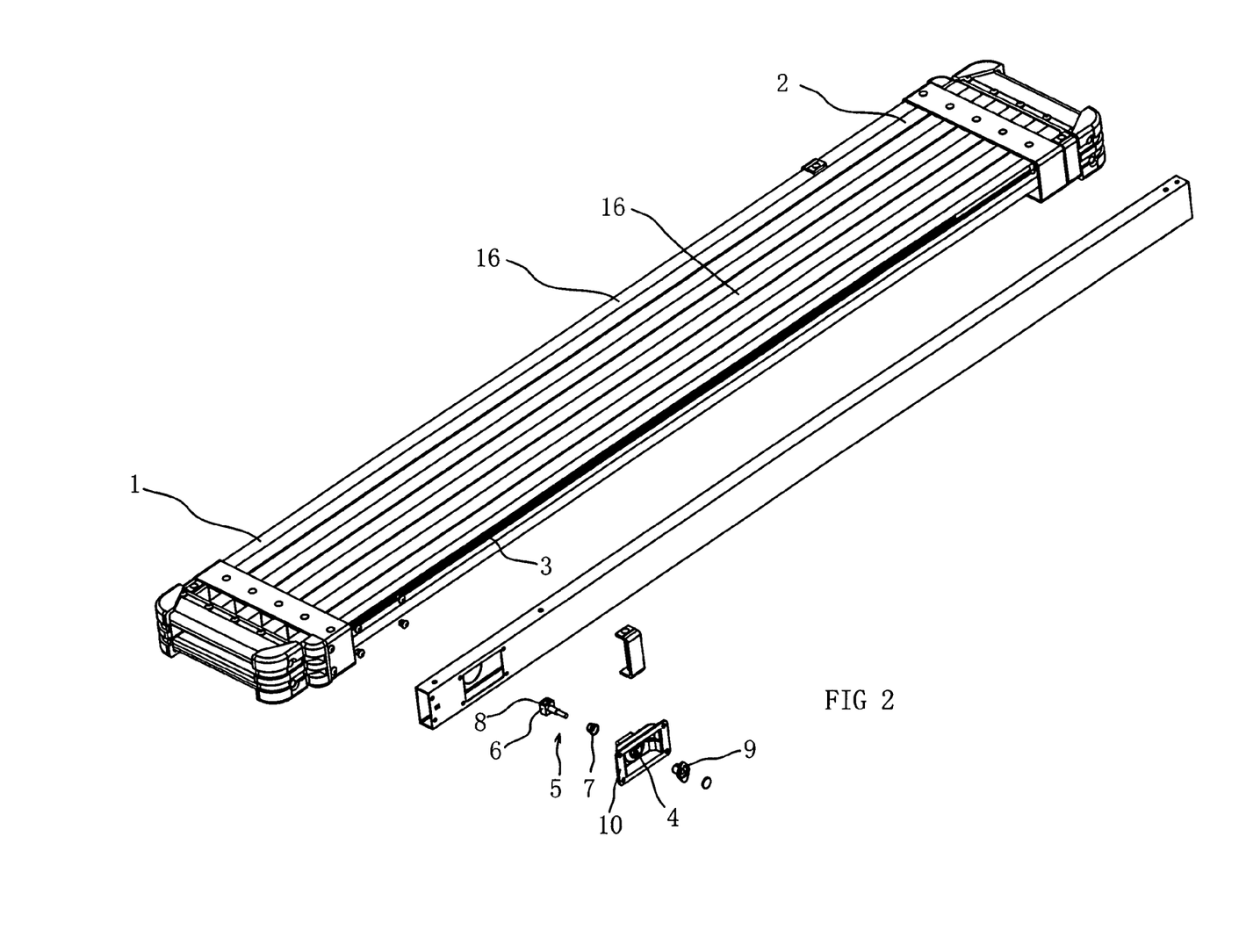
FIG. 2 is a partial exploded schematic view of the present utility model.

As shown in FIG. 2, on the side of the left table board 1 is the rack 3 fixedly positioned, while on the side of the right table board 2 is the corresponding seat body 10, where the seat bore 4 is positioned, in which is the resilient pin 5 positioned vertically to the rack 3. As shown in FIGS. 3 to 8, the resilient pin 5 is mainly composed of the positioning fastener 6 and the spring 7. The positioning fastener 6 is provided at the head with the tooth head 8 engaged with the corresponding rack 3, extends at the tail through the seat bore 4, and is rotatively sleeved at the tail end onto the handle 9. The spring 7 is sleeved onto the positioning fastener 6, and functions between the positioning fastener 6 and the seat bore 4, thus constituting the resilient-pin type telescopic positioning mechanism between the left table board 1 and the right table board 2.

Figure 3:
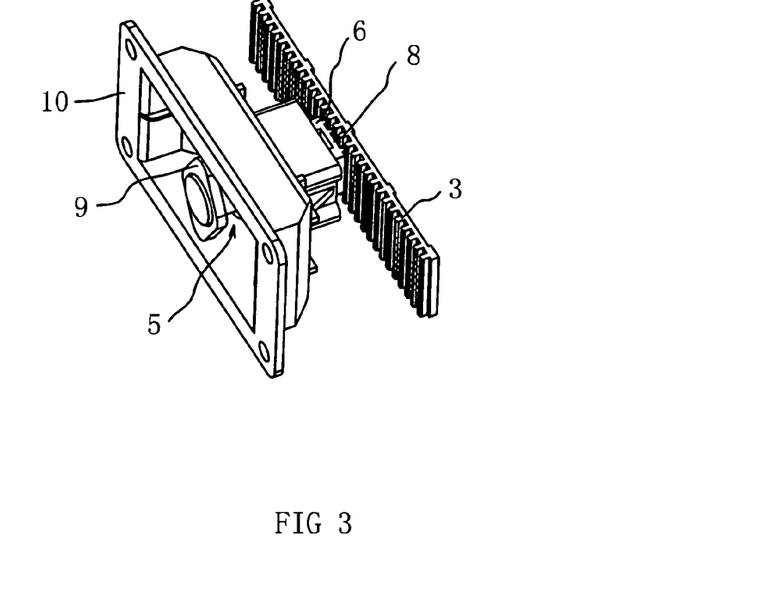
FIG. 3 is a schematic view of the resilient-pin type telescopic positioning mechanism of the present utility model.
Figure 4:
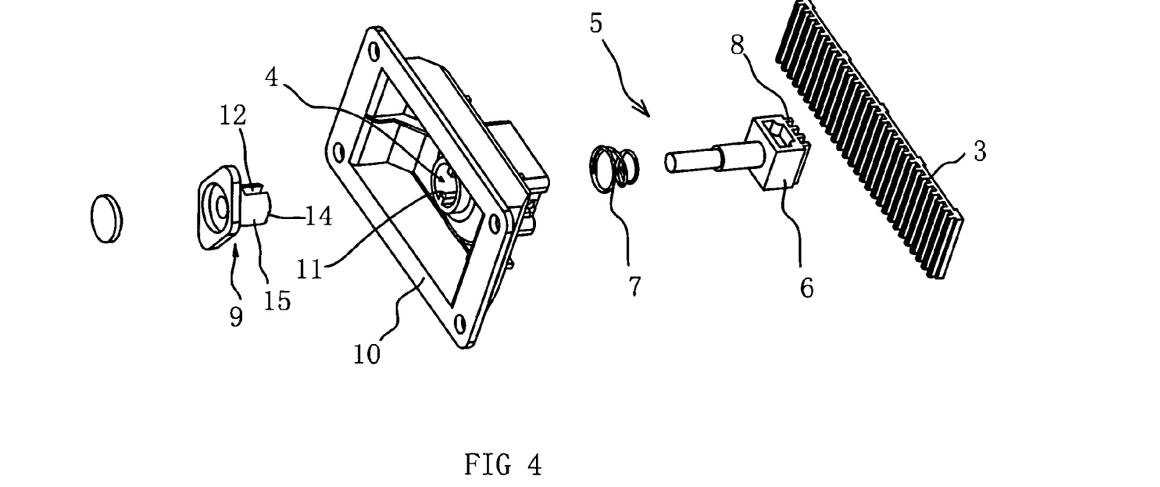
FIG. 4 is an exploded schematic view of the resilient-pin type telescopic positioning mechanism of the present utility model.
Figure 9:
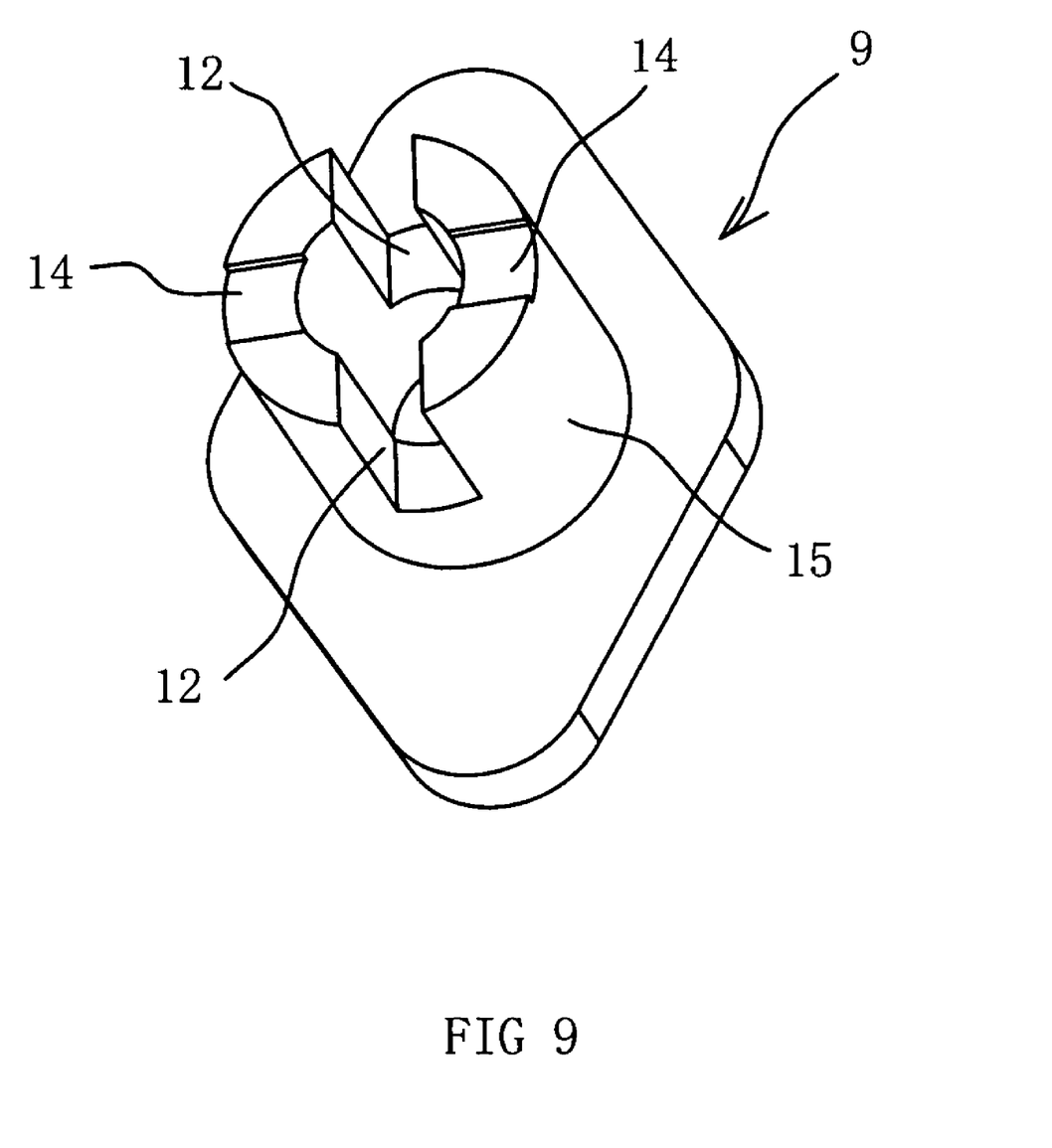
FIG. 9 is a schematic view of the handle of the present utility model.

As shown in FIGS. 3 and 9, the handle 9 is provided with the cylindrical inserted segment 15, which is inserted in the seat bore 4, inside which are the two positioning lugs 11 symmetrically positioned up and down. The inserted segment 15 of the handle 9 is provided on the head face with the two locking positioning slots 12 corresponding to the two positioning lugs 11, and the above-mentioned two locking positioning slots 12 are further provided, in the place with 90° rotation round the central axis of the inserted segment 15, with the two unlocking positioning slots 14, thus forming the two shift positions, one being high while the other low, on the head face of the inserted segment 15, corresponding to the locking state and the unlocking state, respectively. The positioning fastener 6 is cubic in the head, and the seat bore 4 also square in the end facing the positioning fastener 6, the head of the positioning fastener 6 being inserted into the square end of the seat bore 4 to get both fitted.

The above embodiment is used only for explaining the technical concept and characteristics of the present utility model. It is provided to make those skilled in the art understand the present utility model and implement it, and cannot thereby limit the extent of protection of the present utility model. All equivalent changes or modifications according to the spirit of the present utility model should fall within the extent of protection of the present utility model.

What is claimed is:

1. A telescopic table board positioned with a resilient pin, the telescopic table board comprising:
    a left table board and a right table board slidely nested with each other;
    wherein:
    as for the left table board and the right table board, one of them is fixedly provided with a rack, while the other with a corresponding seat bore, in which is a resilient pin positioned, which is mainly composed of a positioning fastener and a spring;
    the positioning fastener has a head and a tail, is provided at the head with a tooth head engaged with the corresponding rack, extends at the tail through the seat bore, and is provided at the tail end with a handle, the handle being provided with a cylindrical inserted segment, which is inserted in the seat bore, which is provided inside with a positioning lug;
    the inserted segment is provided on the head face with a locking positioning slot corresponding to the positioning lug, thus forming two shift positions, one being high while the other low, on the head face of the inserted segment, corresponding to a locking state and an unlocking state, respectively; and
    the spring is sleeved onto the positioning fastener, and functions between the positioning fastener and the seat bore, thus constituting a telescopic positioning mechanism between the left table board and the right table board.

2. The telescopic table board positioned with the resilient pin according to claim 1, the positioning lug comprising two positioning lugs and the locking positioning slot comprising two locking positioning slots, wherein:
    the seat bore is provided inside with the two positioning lugs symmetrically positioned up and down;
    the inserted segment is provided on the head face with the two locking positioning slots corresponding to the two positioning lugs; and
    the two locking positioning slots are further provided, in the place with 90° rotation round the central axis of the inserted segment, with two unlocking positioning slots.

3. The telescopic table board positioned with the resilient pin according to claim 1, wherein the positioning fastener is rotatively sleeved onto the handle.

4. The telescopic table board positioned with the resilient pin according to claim 3, wherein the positioning fastener is cubic in the head, and the seat bore also square in the end facing the positioning fastener, the head of the positioning fastener being inserted into the square end of the seat bore to get both fitted.

5. The telescopic table board positioned with the resilient pin according to claim 1, wherein the positioning fastener is fixedly connected with the handle.

6. The telescopic table board positioned with the resilient pin according to claim 1, wherein the rack, the seat bore and the resilient pin are all positioned on a side of the left table board and the right table board, respectively.

7. The telescopic table board positioned with the resilient pin according to claim 1, wherein the telescopic positioning mechanism further includes a seat body, where the seat bore is drilled and via which positioned on the left table board or the right table board.

8. The telescopic table board positioned with the resilient pin according to claim 1, wherein the resilient pin is positioned vertically to the rack.

9. A telescopic table board positioned with a resilient pin, the telescopic table board comprising:
    a left table board and a right table board slidely nested with each other;
    wherein:
    as for the left table board and the right table board, one of them is fixedly provided with a rack, while the other with a corresponding seat bore, in which is a resilient pin positioned, which is mainly composed of a positioning fastener and a spring;
    the positioning fastener has a head and a tail, is provided at the head with a tooth head engaged with the corresponding rack, extends at the tail through the seat bore, and is provided at the tail end with a handle; and
    the spring is sleeved onto the positioning fastener, and functions between the positioning fastener and the seat bore, thus constituting a telescopic positioning mechanism between the left table board and the right table board;
    the positioning fastener is rotatively sleeved onto the handle; and
    the positioning fastener is cubic in the head, and the seat bore also square in the end facing the positioning fastener, the head of the positioning fastener being inserted into the square end of the seat bore to get both fitted.

* * * * *